(12) United States Patent
Blaum et al.

(10) Patent No.: US 7,227,710 B2
(45) Date of Patent: Jun. 5, 2007

(54) METHOD FOR OPERATING DISK DRIVE HAVING IMPROVED TIMING MARKS

(75) Inventors: Mario Blaum, San Jose, CA (US); Mantle M. Yu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 633 days.

(21) Appl. No.: 10/676,632

(22) Filed: Sep. 30, 2003

(65) Prior Publication Data

US 2005/0068663 A1  Mar. 31, 2005

(51) Int. Cl.
*G11B 5/09* (2006.01)
(52) U.S. Cl. .......................................... 360/49; 360/51
(58) Field of Classification Search ..................... None
See application file for complete search history.

(56) References Cited

U.S. PATENT DOCUMENTS

| | | | |
|---|---|---|---|
| 4,914,535 A | 4/1990 | Weng | 360/72.2 |
| 5,903,410 A | 5/1999 | Blaum et al. | 360/77.08 |
| 5,999,110 A | 12/1999 | Blaum et al. | 341/59 |
| 6,288,861 B1 * | 9/2001 | Blaum et al. | 360/49 |
| 6,411,452 B1 | 6/2002 | Cloke | 360/51 |
| 6,463,564 B1 | 10/2002 | Weng | 714/784 |
| 7,042,666 B2 * | 5/2006 | Blaum et al. | 360/49 |

* cited by examiner

*Primary Examiner*—K. Wong
(74) *Attorney, Agent, or Firm*—Patrick Duncan; Marek Alboszta

(57) ABSTRACT

A method for operating a disk drive having timing marks (TMs) on the disk that are chosen to reduce the probability of misidentification of a TM in the presence of read errors. The disk drive searches for TMs within a fixed TM search window which extends past the TM on the disk. A TM preferably maximizes the post-shift sliding distance for m post-shifts of the TM pattern, where m corresponds to the TM search window boundary. In this manner, the probability of a misidentification of the TM due to a post-shift having a small distance from the TM pattern is reduced. The TM pattern also provides pre-shift error resistance.

17 Claims, 2 Drawing Sheets

| shift | distance | 1 | 1 | 1 | 1 | 1 | 1 | 1 | 0 | 0 | 0 | 1 | 0 | 0 | 1 |
|---|---|---|---|---|---|---|---|---|---|---|---|---|---|---|---|
| pre 7 | 5 | 0 | 0 | 0 | 1 | 0 | 0 | 1 |   |   |   |   |   |   |   |
| pre 6 | 6 |   | 0 | 0 | 0 | 1 | 0 | 0 | 1 |   |   |   |   |   |   |
| pre 5 | 5 |   |   | 0 | 0 | 0 | 1 | 0 | 0 | 1 |   |   |   |   |   |
| pre 4 | 4 |   |   |   | 0 | 0 | 0 | 1 | 0 | 0 | 1 |   |   |   |   |
| pre 3 | 4 |   |   |   |   | 0 | 0 | 0 | 1 | 0 | 0 | 1 |   |   |   |
| pre 2 | 5 |   |   |   |   |   | 0 | 0 | 0 | 1 | 0 | 0 | 1 |   |   |
| pre 1 | 4 |   |   |   |   |   |   | 0 | 0 | 0 | 1 | 0 | 0 | 1 |   |
| align | 0 |   |   |   |   |   |   |   | 0 | 0 | 0 | 1 | 0 | 0 | 1 |
| post 1 | 3 |   |   |   |   |   |   |   |   | 0 | 0 | 0 | 1 | 0 | 0 |
| post 2 | 3 |   |   |   |   |   |   |   |   |   | 0 | 0 | 0 | 1 | 0 |
| post 3 | 1 |   |   |   |   |   |   |   |   |   |   | 0 | 0 | 0 | 1 |

Fig. 3

| shift | distance | 1 | 1 | 1 | 1 | 1 | 1 | 1 | 0 | 0 | 1 | 1 | 1 | 0 | 1 |
|---|---|---|---|---|---|---|---|---|---|---|---|---|---|---|---|
| pre 7 | 3 | 0 | 0 | 1 | 1 | 1 | 0 | 1 |   |   |   |   |   |   |   |
| pre 6 | 4 |   | 0 | 0 | 1 | 1 | 1 | 0 | 1 |   |   |   |   |   |   |
| pre 5 | 3 |   |   | 0 | 0 | 1 | 1 | 1 | 0 | 1 |   |   |   |   |   |
| pre 4 | 3 |   |   |   | 0 | 0 | 1 | 1 | 1 | 0 | 1 |   |   |   |   |
| pre 3 | 5 |   |   |   |   | 0 | 0 | 1 | 1 | 1 | 0 | 1 |   |   |   |
| pre 2 | 5 |   |   |   |   |   | 0 | 0 | 1 | 1 | 1 | 0 | 1 |   |   |
| pre 1 | 4 |   |   |   |   |   |   | 0 | 0 | 1 | 1 | 1 | 0 | 1 |   |
| align | 0 |   |   |   |   |   |   |   | 0 | 0 | 1 | 1 | 1 | 0 | 1 |
| post 1 | 3 |   |   |   |   |   |   |   |   | 0 | 0 | 1 | 1 | 1 | 0 |
| post 2 | 3 |   |   |   |   |   |   |   |   |   | 0 | 0 | 1 | 1 | 1 |
| post 3 | 3 |   |   |   |   |   |   |   |   |   |   | 0 | 0 | 1 | 1 |
| post 4 | 1 |   |   |   |   |   |   |   |   |   |   |   | 0 | 0 | 1 |

Fig 4

METHOD FOR OPERATING DISK DRIVE HAVING IMPROVED TIMING MARKS

CROSS REFERENCE TO RELATED APPLICATIONS

This application is related to commonly assigned application Ser. No. HSJ9-2003-0187US1, entitled "Disk drive having improved timing marks", filed on even date herewith, and hereby incorporated by reference.

FIELD OF THE INVENTION

This invention relates to disk drives for data storage, and in particular to disk drives that have timing marks on disk tracks for servo head control or for data synchronization.

BACKGROUND

Data is recorded on magnetic disk drives in radially spaced tracks on the surface of one or more rotating disks. Typically, a single recording head, which may be an inductive read/write head, or an inductive write head in combination with a magnetoresistive read head, is associated with a corresponding magnetic recording surface of each disk. Each recording head is moved by an actuator in a generally radial direction toward and away from the center of rotation of the disks, to align the head to a desired track.

It is necessary to know the precise radial and circumferential location of the recording heads relative to their associated disk surfaces. For conventional fixed-block architecture disk drives, position information is typically recorded onto the disk as servo information in angularly spaced servo sectors interspersed among the data sectors.

Each of the servo sectors contains a servo timing mark (STM), which is a defined bit pattern. A servo timing mark is also known as a servo identification (SID) or a servo address mark (SAM) in the art. When an STM is identified in reading the disk, subsequent detection of servo information (e.g., track identification and position error signal bursts) is initiated. This servo information is used by servo electronics to determine the radial position of the head and to provide feedback to the actuator to ensure the head remains positioned over the centerline of the desired track. In some cases, the STMs are also used to assist in locating specific data sectors where user data is to be read or written (e.g., as described in U.S. Pat. No. 5,500,848).

Accurate detection of STMs is crucial to proper disk drive operation, since such detection is required in order to correctly recognize subsequent servo information. If a servo sector is not recognized due to failure to detect the STM, the servo electronics will rely on less recent servo information (e.g., from the most recent recognized servo sector), and servo tracking and timing accuracy will be diminished. Also, if an STM is incorrectly detected at the wrong location, subsequent servo information will be missed and/or incorrectly interpreted and acted upon. Incorrectly recognizing an STM and acting incorrectly as a result tends to be more problematic than failure to recognize an STM.

Detection of an STM pattern within a servo sector can be reformulated as detection of a known bit pattern (i.e., the STM bit pattern) embedded within an input stream subject to error (i.e., the sequence of bits read from the disk). A known approach for locating the STM bit pattern within the input stream is to compare an n-bit STM bit pattern to a window consisting of n consecutive bits in the input stream, and successively shifting the window, one bit at a time, until a match is found between the window and the STM bit pattern.

How well two bit sequences of equal length match each other is conveniently described by the Hamming distance, which is the number of bits which differ in the two sequences. A perfect match corresponds to a Hamming distance of zero. It is also convenient to define the above shifts as pre-shifts, where pre-shift 1 corresponds to a window position starting 1 bit before the start of the STM pattern in the input stream, pre-shift 2 corresponds to a window starting 2 bits before the STM pattern, etc. Accordingly the above procedure can be expressed as calculating the Hamming distance for pre-shifts k, k−1, k−2, . . . , 2, 1, 0 in succession, for a suitably chosen integer k, and identifying pre-shift 0 (i.e., the STM) when a Hamming distance of 0 is found.

In the absence of errors, a perfect match will occur between the STM pattern and the window when the window is aligned to the STM pattern in the input stream, and this perfect match indicates detection of the STM on the disk, provided there is no other perfect match to the STM pattern in the input stream. Naturally, it is necessary to restrict the search for an STM to regions of the disk which are substantially free of user data, since user data may coincidentally contain the same bit pattern as the STM bit pattern.

In the presence of errors, a perfect match is not to be expected, even when the window is aligned to the STM pattern in the input stream. However, it is known in the art to select an STM pattern that provides generally large Hamming distance for pre-shifts 1 through n for an n-bit STM pattern. Such an STM pattern minimizes the chances of misidentification of the STM pattern based on a low Hamming distance between the STM pattern and a pre-shifted position of the window. Since the pre-shifted window includes bits from the input stream before the STM pattern, a preamble bit sequence having at least n bits is typically prepended to the STM pattern on the disk. Inclusion of the preamble fixes the pre-shifted bit patterns, and renders them independent of any data or other information on the disk. A commonly used preamble pattern is all ones, but any other bit pattern may be used as well. If the minimum Hamming distance between the STM pattern and pre-shifts 1 through n is d1, then d1 is referred to as the pre-shift sliding distance.

However, this prior art approach has some drawbacks. Essentially, a search for the presence of an STM within an STM search window on the disk is performed, since this search cannot go on indefinitely. If the STM is not found within the search window, some alternative correction action is taken. If the STM search window does not extend past the STM, then the probability of missing the STM is undesirably increased (e.g., if the STM window is set incorrectly by only 1 bit so that it does not include the entire STM, the STM will be missed in the search). However, if the STM search window extends past the STM, then erroneous recognition of the STM is possible, because the prior art STM patterns are optimized only with respect to pre-shifts. Erroneous recognition of an STM pattern is typically a much more severe problem than not finding an STM pattern, since erroneous recognition may lead the disk drive to take further erroneous decisions (e.g., misidentifying the track).

Accordingly, it would be an advance in the art to provide an STM search window which extends past the STM on the disk while avoiding the erroneous recognition problem identified above. It would also be an advance to provide STM patterns compatible with this STM search window.

SUMMARY

In one aspect of the invention, the present invention provides a disk drive having timing marks (TMs) within timing sections of disk tracks, with reduced probability of missing or misidentifying TMs in operation. More specifically, the disk drive searches for TMs on the disk within an TM search window which extends past the TM on the disk, which reduces the probability of missing an TM due to misalignment of the TM search window with respect to the TM.

TM patterns for use with embodiments of the present invention are preferably chosen to reduce the probability of misidentification of an TM in the presence of read errors. More specifically, an n-bit TM is preferably chosen to maintain a maximal post-shift sliding distance d2 for m post-shifts of the TM pattern relative to the input stream, where m is selected to correspond to the nominal boundary of the TM search window. In this manner, the probability of a misidentification of the TM due to a post-shift having a small Hamming distance from the TM pattern may be reduced. In addition, the TM pattern maintains a selected pre-shift sliding distance d1 for n pre-shifts of the TM pattern relative to the input stream.

In a preferred embodiment, the timing marks are servo timing marks (STMs), and are followed by servo position information. Recognition of the STMs enables the servo position information to be used to control the head position during disk operation. In an alternate preferred embodiment, the timing marks are data timing marks (DTM), and are followed by data. Recognition of the DTMs facilitates byte synchronization of data.

BRIEF DESCRIPTION OF THE DRAWINGS

FIG. 2b schematically shows details of the servo sector of FIG. 2a.

FIG. 3 is a table showing Hamming distances from a pattern u1={0,0,0,1,0,0,1} to pre-shifted and post-shifted instances of u1, using a preamble pattern of all ones, according to an embodiment of the invention.

FIG. 4 is a table showing Hamming distances from a pattern u2={0,0,1,1,1,0,1} to pre-shifted and post-shifted instances of u2, using a preamble pattern of all ones, according to an embodiment of the invention.

DETAILED DESCRIPTION OF THE DRAWINGS

Figure 1:
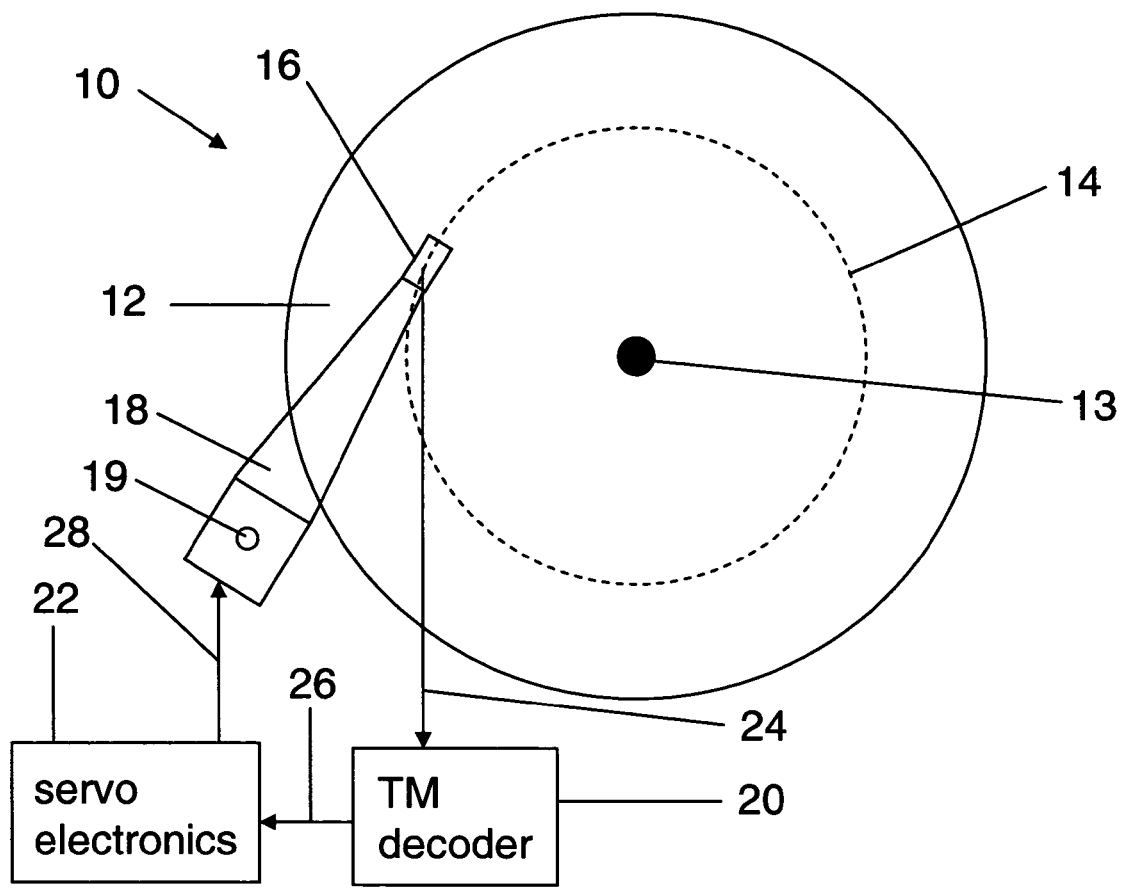
FIG. 1 schematically shows a disk drive according to one embodiment of the invention.

FIG. 1 schematically shows a disk drive 10 that is representative of the type of disk drive according to one embodiment of the invention. Disk drive 10 includes disk 12, read/write head 16 (also called a data recording transducer), actuator 18, TM decoder 20, and servo electronics 22. Disk, 12 has a set of radially spaced tracks, one of which is shown at 14. Disk 12 is rotated about its center 13 by a motor (not shown). Information is written to and/or read from track 14 by read/write head 16. Read/write head 16 is connected to actuator 18, which radially positions head 16 over a selected track. For example, actuator 18 may be rotated about axis 19 by an actuator motor (not shown).

Figure 2A:
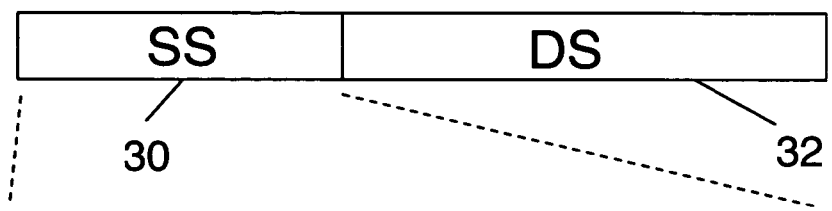
FIG. 2a schematically shows a portion of a track from a disk drive showing a servo sector and a data sector, according to an embodiment of the invention.
Figure 2B:
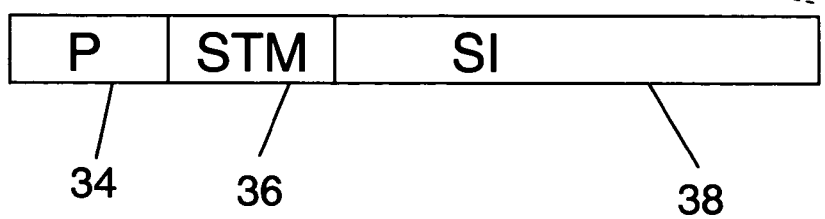

FIG. 2a schematically shows a portion of track 14. Track 14 includes servo sectors (SS) interspersed with data sectors (DS). A servo sector is shown as 30 in FIG. 2a, and a data sector is shown as 32 in FIG. 2a. FIG. 2b shows a more detailed view of servo sector 30 of FIG. 2a. Servo sector 30 includes a preamble bit pattern (P), shown as 34, a servo timing mark bit pattern (STM), shown as 36, and servo information (SI) shown as 38. In FIG. 2b, the head encounters regions 34, 36, and 38 in that order (i.e., the tracks shown in FIGS. 2a and 2b are read from left to right).

Returning now to FIG. 1, read/write head 16 is operably connected to TM decoder 20, as indicated by line 24. As track 14 passes under head 16, the head will encounter servo sectors 30 and data sectors 32. TM decoder 20 receives a bit stream corresponding to the bit stream on track 14, and functions to detect the STM bit pattern 36 within servo sectors 30 as they pass under the head. Upon identification of an STM bit pattern 36, TM decoder 20 transmits an "STM found" signal to servo electronics 22, as schematically indicated by line 26 in FIG. 1. Servo electronics 22 also receives servo information 38 from TM decoder 20, and makes use of servo information 38, gated by the "STM found" signal, to perform closed loop control of actuator 18, schematically indicated by line 28, such that head 16 is centered over a desired track (i.e., track 14 in this example). Further details of head control in response to servo timing marks 36 and servo information 38 are given in U.S. Pat. No. 5,903,410, incorporated by reference in its entirety.

In order to reduce the probability of misidentification of an STM, TM decoder 20 usually only looks for STMs within a STM search window, which nominally extends several bits past an STM on the disk and at least n bits before an STM on the disk. In normal disk drive operation, information obtained from the previous servo sector encountered will enable the STM search window to be set with sufficient accuracy to define its nominal boundaries with respect to the next STM expected as indicated above. Unusual events, such as track changes, error recovery and disk drive start-up use other methods for bounding the search for the STMs, which are known in the art.

Typically, TM decoder 20 compares STM pattern 36 to a window of consecutive bits read from servo sector 30, and this window is successively stepped through the bit stream read from servo sector 30. For example, reading the bit stream from servo sector 30 into a shift register is one way to provide this stepped windowing.

Therefore, the performance of an STM pattern u1 can be assessed by computing Hamming distances between u1 and shifted versions of u1, as shown on FIG. 3 for u1={0,0,0,1,0,0,1}. The top row of FIG. 3 shows the sequence of bits on the disk, also referred to as the input stream. In this example, the STM pattern u1 is preceded by a preamble pattern which is all ones. Pre-shift k, indicated by "pre k" on FIG. 3, indicates a window position that is shifted k bits before the STM pattern in the input stream. Similarly, post-shift k, indicated by "post k" on FIG. 3, indicates a window position that is shifted k bits after the STM pattern in the input stream.

Due to the presence of the preamble pattern in the example of FIG. 3, the Hamming distances between u1 and each of the pre-shifts can be computed straightforwardly, and are given in the "distance" column of FIG. 3. In this example, the smallest Hamming distance between u1 and any of pre-shift 1 through pre-shift n, also known as the pre-shift sliding distance, is 4. Here n is the number of bits in the STM pattern. When the window is aligned to the STM pattern, indicated by "align" on FIG. 3, the Hamming distance between u1 and the window is zero, as indicated on FIG. 3.

FIG. 3 also shows the first few post-shifts. For post-shifts, the window extends past the end of the STM pattern and covers bits which are not part of the STM bit pattern. It is possible to add a postscript bit pattern after the STM, similar to the preamble bit pattern before the STM, to make the Hamming distance calculation definite for post-shifts. Alternatively, it is also possible to perform the distance calculation for post-shifts as a "worst-case" calculation, where all bits of the window extending past the STM pattern on the disk are assumed to match the STM pattern. The worst case approach has the advantage that fewer bits on the disk are required for STM detection than if a postscript pattern is used (which increases the fraction of disk area devoted to user data), while the use of a postscript pattern will provide improved error resistance. The post-shift distances given in Example 3 are calculated using the above worst case assumption.

The STM pattern of FIG. 3 provides a pre-shift sliding distance of 4, and a post-shift sliding distance of 3 for two post-shifts past alignment. Since the number of post-shifts past alignment which are of interest is a variable parameter, the post-shift sliding distance is expressed with the notation (d2; m), meaning that distance no less than d2 is obtained for the first m post-shifts past alignment. With this notation, the worst case post-shift sliding distance is the minimum distance between the first n−k bits of the STM bit pattern and the last n−k bits of the STM bit pattern as k is varied from 1 to m. We have found that the pre-shift sliding distance and the post-shift sliding distance can be traded off. For example, by reducing a requirement on pre-shift sliding distance, it is usually possible to increase m for a fixed d2 in the post-shift sliding distance (d2, m).

FIG. 4 provides a demonstration of such a trade. The STM sequence in FIG. 4 is u2={0,0,1,1,1,0,1}. As seen in FIG. 4, this sequence provides a pre-shift sliding distance of 3 (one less than provided by u1 of FIG. 3), and provides a post-shift sliding distance of (3; 3) as opposed to the post-shift sliding distance of (3; 2) provided by u1 of FIG. 3.

STM patterns having desirable pre-shift and post-shift distances can be determined using a systematic computer-assisted search. Results of such a search for 16-bit STM patterns are presented in the following table:

TABLE 1

Error-resistant 16-bit STM patterns

| pattern | pre-shift sliding distance d1 | post-shift sliding distance (d2; m) |
|---|---|---|
| 0001 0100 1001 1101 | 9 | (9; 1) |
| 0001 0100 1001 1101 | 9 | (8; 1) |
| 0001 0100 1001 1101 | 9 | (7; 2) |
| 0001 0100 1001 1101 | 9 | (6; 4) |
| 0001 1001 0101 0011 | 8 | (8; 3) |
| 0010 0010 1100 0011 | 8 | (7; 5) |
| 0000 0111 0101 0011 | 8 | (6; 7) |
| 0000 0101 1011 1001 | 8 | (5; 9) |
| 0010 0111 0100 0011 | 7 | (7; 6) |
| 0000 0101 1011 1000 | 7 | (6; 8) |
| 0000 0101 1011 1100 | 7 | (5; 10) |
| 0100 0111 1101 1000 | 6 | (6; 9) |
| 0000 0101 1011 1100 | 6 | (5; 10) |
| 0000 0001 0100 1111 | 6 | (4; 12) |

In Table 1, the STM patterns are given in the leftmost column. Spaces are inserted into the patterns as shown in Table 1 for readability only. On the disk, these STM patterns occupy 16 consecutive bit positions. For each case (i.e., row of Table 1), the pre-shift sliding distance d1 is given in the center column, and the post-shift sliding distance (d2; m) is given in the right column. In Table 1, post-shift sliding distances are based on the worst case calculation discussed above. The patterns in Table 1 are selected to have maximal m, given n, d1, and d2. Generally, decreasing d1 and/or d2 allows this maximal m to be increased to a larger value, as shown on Table 1, and as expected from the examples of FIGS. 3 and 4. The results of Table 1 are obtained using a preamble pattern of all ones. If a different preamble pattern is used, equivalent performance will be obtained (i.e., m in each row will not change), but different STM patterns will be determined by the computer search for achieving this performance.

Although the specific optimization performed to generate Table 1 is the maximization of m given d1, d2, and n, results of other optimizations may also be determined from Table 1. Two examples are as follows: for n=16, d1=9, m=2, the maximal d2 is 7; and for n=16, d2=7, m=5, the maximal d1 is 8. Alternatively, the systematic computer search used to generate Table 1 can readily be altered to maximize d1 given the other parameters, or to maximize d2 given the other parameters, or to minimize n given the other parameters as opposed to maximizing m given the other parameters. All four approaches are substantially equivalent ways to generate STM patterns in accordance with teachings of the invention. It is convenient to refer to STM patterns generated by any of the above identified optimization methods as (n, d1, d2, m) patterns.

In practice, it is expected that the most typical optimization will be the maximization of d2, given n, d1 and m. The reason for this is that n is typically fixed by high level design considerations (e.g., how much disk area to devote to the STM patterns), d1 is selected to provide the desired level of error resistance for pre-shifts, m and the boundary of the STM search window are selected together to reduce the probability of the search window boundary falling within the STM to a design value, and then d2 is maximized to provide as much post-shift error resistance as possible given the other constraints. Providing resistance to pre-shift errors tends to be more important than providing post-shift error resistance. One reason is that post-shift error resistance is only relevant if the STM is missed, which itself is a low probability event. Accordingly, a design will typically end up with d1>d2, although this is not required to practice the invention.

In some cases, the computer search for optimized STM patterns will provide multiple patterns satisfying the same constraint. In these cases, one can select an STM pattern from a set of (n, d1, d2, m) patterns having the same n, d1, d2, and m according to various criteria. Such criteria include, but are not limited to, maximizing the number of ones, minimizing the length of the longest run of zeros, and minimizing the number of times the distance takes on its minimal value for pre-shifts and/or post-shifts.

The examples of FIGS. 3 and 4, and the results of Table 1, are all based on the use of a preamble sequence of at least n bits, where all of the preamble bits are ones. Any other fixed preamble bit sequence of at least n bits is also suitable for practicing the invention. In practice, other criteria may be used to select the preamble bit pattern, such as suitability for automatic gain control.

In the examples of FIGS. 3 and 4, and the results of Table 1, all of the Hamming distances were computed bitwise. This method of computing distances is suitable in cases where bit errors tend to be independent. In some cases, however, bit errors are not independent (e.g., if errors tend to occur in bursts affecting some number of consecutive bits). In such cases, the use of a burst Hamming distance (instead of a bitwise Hamming distance) to select and use STM patterns in accordance with the invention is suitable. The j-bit burst Hamming distance between two bit sequences is calculated by comparing the two sequences j bits at a time, according to the following procedure: If two j-bit subsequences are identical, add 0 to the distance. If two j-bit subsequences differ, add 1 to the distance. Repeat for each j-bit subsequence in the two sequences. If there is a last subsequence of less than j bits, treat it the same way as all the other subsequences.

Thus the j-bit burst Hamming distance between two bit sequences is the number of differences between the two sequences, where differences are counted by comparing j-bit blocks as opposed to single bits. According to this definition, the 1-bit burst Hamming distance is identical to the bitwise Hamming distance. STM patterns according to the present invention can be generated by systematic computer searching using either a bitwise Hamming distance, or a j-bit burst Hamming distance.

Although the embodiment discussed above is presented in the context of a magnetic disk drive having a specific architecture, the invention is applicable to magnetic or optical disks having other architectures and/or other servo techniques which depend on recognition of a known bit pattern on a disk.

Furthermore, although the embodiments discussed in detail above relate to locating a servo timing mark to signal the presence of servo information on a disk, the invention is applicable to locating any mark represented by a bit pattern on a disk. For example, byte synchronization is required before reading data from a disk, and therefore a known data timing mark bit pattern typically precedes the data. The apparatus and methods of the present invention are advantageously applicable for locating such data timing marks with reduced probability of error. For both applications (servo and data), it is necessary to locate a timing mark within a timing section within a disk track. For the servo application, the timing sections are the servo sectors identified above, while for the data application, the timing sections precede the data.

What is claimed is:

1. A method for locating a timing mark (TM) on a rotating disk of a disk drive, the disk having a plurality of tracks, each track having a plurality of timing sections containing a preamble represented as a preamble pattern of at least n bits, and a TM following the preamble, the method comprising:
    representing said TM as a TM pattern of n bits, wherein said TM pattern has a pre-shift sliding distance d1 to the concatenation of said preamble pattern with said TM pattern, and has a post-shift sliding distance (d2; m) to said TM pattern, said TM pattern being referred to as a (n, d1, d2, m) pattern, wherein said TM pattern satisfies an optimality condition selected from the group consisting of: m is maximal given n, d1, and d2; d1 is maximal given n, d2, and m; d2 is maximal given n, d1, and m; and n is minimal given d1, d2, and m;
    reading a bit stream from said track; and
    searching for said TM bit pattern within an TM search window which nominally extends m bits past the last bit of the TM on the disk and at least n bits before the first bit of the TM on the disk.

2. The method of claim 1, wherein said timing marks are followed by data on said tracks.

3. The method of claim 1, wherein said timing marks are followed by servo position information on said tracks.

4. The method of claim 3, further comprising:
    providing an actuator connected to said head for positioning said head to one of said tracks and maintaining said head on said one of said tracks; and
    controlling the actuator in response to said servo position information read by said head after detection of said TMs by said TM decoder.

5. The method of claim 1, wherein the sliding distances d1 and (d2; m) are bitwise Hamming distances.

6. The method of claim 1, wherein the sliding distances d1 and (d2; m) are j-bit burst Hamming distances.

7. The method of claim 1, wherein said TM pattern is a member of a set of (n, d1, d2, m) patterns, wherein all members of the set have the same n, the same d1, the same d2 and the same m, said set having at least two members.

8. The method of claim 7, wherein each member j of said set has a longest run of zeros with length L(j), and said TM pattern is a member of said set with minimal L(j).

9. The method of claim 7, wherein said TM pattern is a member of said set having a maximal number of ones.

10. The method of claim 1, wherein said post-shift sliding distance (d2; m) is the minimum distance between the first n−k bits of said TM bit pattern and the last n−k bits of said TM bit pattern as integer k is varied from 1 to m inclusive.

11. The method of claim 1, further comprising providing a postscript adjacent to and positioned after the TM in each of said timing sections, the postscript being represented as a postscript bit pattern having at least n bits.

12. The method of claim 11, wherein said post-shift sliding distance (d2; m) is the minimum distance between said TM pattern and bits k+1 through n+k of a concatenation of said TM bit pattern followed by said postscript bit pattern.

13. The method of claim 1, wherein d2 is greater than 2.

14. The method of claim 13, wherein m is greater than 2.

15. The method of claim 1, wherein m is greater than 2.

16. The method of claim 1, wherein said disk comprises a magnetic disk.

17. The method of claim 1, wherein said disk comprises an optical disk.

* * * * *